US008531800B1

(12) United States Patent
Contreras et al.

(10) Patent No.: US 8,531,800 B1
(45) Date of Patent: Sep. 10, 2013

(54) MAGNETIC WRITE HEAD HAVING DUAL PARALLEL CAPACITORS FOR INTEGRATED TRANSMISSION LINE COMPENSATION

(71) Applicant: HGST Netherlands B.V., Amsterdam (NL)

(72) Inventors: John T. Contreras, Palo Alto, CA (US); David J. Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/689,569

(22) Filed: Nov. 29, 2012

(51) Int. Cl.
*G11B 5/48* (2006.01)

(52) U.S. Cl.
USPC .......................................... 360/246

(58) Field of Classification Search
USPC .............. 360/234.5, 234.7, 245.8, 245.9, 246
See application file for complete search history.

(56) References Cited

U.S. PATENT DOCUMENTS

| 5,995,329 | A | * | 11/1999 | Shiraishi et al. | 360/245.9 |
| 6,160,688 | A | * | 12/2000 | Okumura | 360/323 |
| 7,274,539 | B2 | | 9/2007 | Kiyono et al. | |
| 7,392,579 | B2 | | 7/2008 | Leung et al. | |
| 7,542,245 | B2 | * | 6/2009 | Kagami et al. | 360/317 |
| 7,545,608 | B2 | * | 6/2009 | Araki et al. | 360/319 |
| 7,573,677 | B2 | * | 8/2009 | Nikitin et al. | 360/234.5 |
| 7,609,482 | B2 | * | 10/2009 | Kiyono | 360/246 |
| 7,672,084 | B2 | * | 3/2010 | Kagami et al. | 360/317 |
| 7,675,716 | B2 | * | 3/2010 | Kagami et al. | 360/319 |
| 8,081,399 | B2 | | 12/2011 | Contreras et al. | |
| 2007/0211373 | A1 | * | 9/2007 | Lee et al. | 360/81 |
| 2008/0151436 | A1 | * | 6/2008 | Sato et al. | 360/313 |
| 2012/0050919 | A1 | | 3/2012 | Brown et al. | |

OTHER PUBLICATIONS

Klaassen et al., "Write-To-Read Coupling," 2002 IEEE, IEEE Transactions on Magnetics, vol. 38, No. 1, Jan. 2002, pp. 61-67.

* cited by examiner

*Primary Examiner* — Angel Castro
(74) *Attorney, Agent, or Firm* — Zilka-Kotab, PC

(57) ABSTRACT

In one embodiment, a magnetic head includes a write pole; a write coil adapted for causing the write pole to emit a magnetic field upon excitation of the write coil; and a first capacitor and a second capacitor electrically connected in parallel with the write coil, each capacitor including a planar bottom plate, a top plate positioned parallel to the bottom plate, and at least one dielectric layer positioned between the top plate and the bottom plate, wherein a parasitic capacitance between the bottom plate of each capacitor and a substrate positioned below the bottom plate exists during writing operations of the magnetic head, and wherein the parasitic capacitances of the capacitors are about balanced.

10 Claims, 16 Drawing Sheets

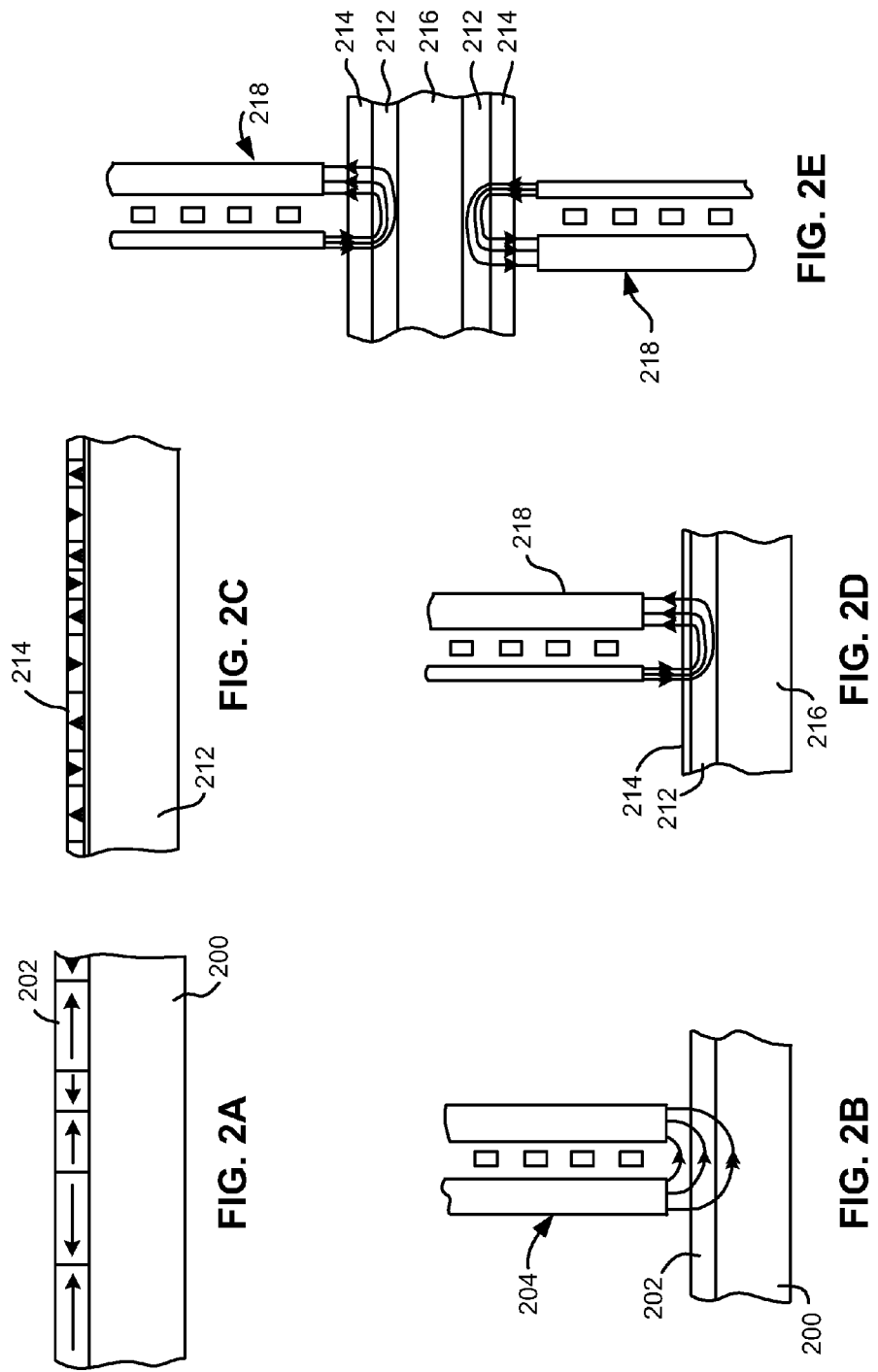

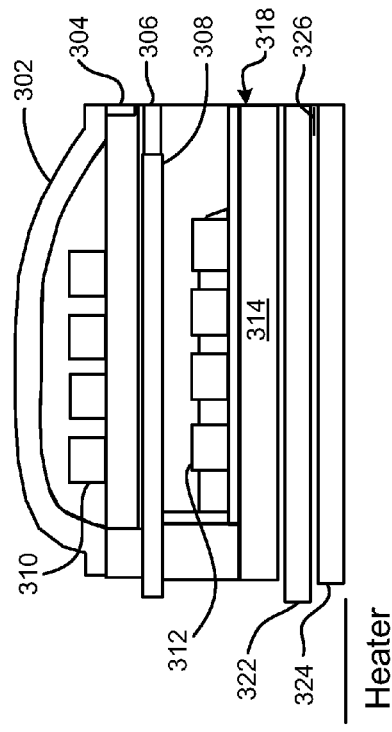
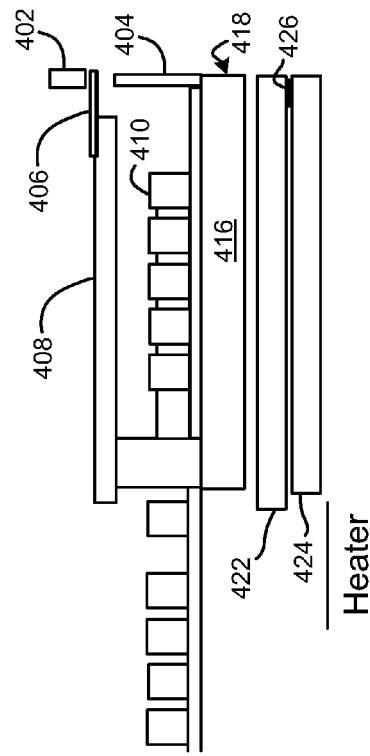
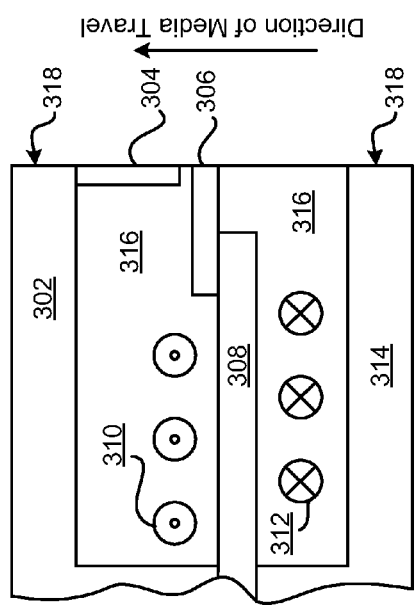
FIG. 3A
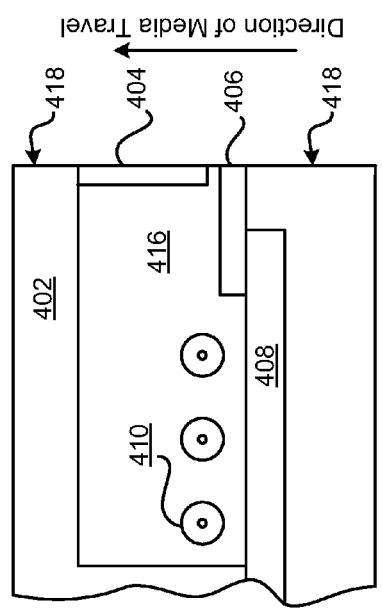
FIG. 4A

MAGNETIC WRITE HEAD HAVING DUAL PARALLEL CAPACITORS FOR INTEGRATED TRANSMISSION LINE COMPENSATION

FIELD OF THE INVENTION

The present invention relates to data storage systems, and more particularly, this invention relates to a write head utilizing a dual capacitor design for integrated transmission line compensation.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Perpendicular magnetic recording, in which the recorded bits are stored in a perpendicular or out-of-plane orientation in the recording layer of a magnetic medium, allows for ultra-high recording densities in magnetic recording systems, such as HDDs. The write head must be able to write data not only at high bit-density but also at high data-rates. However, the switching time for the write pole of the write head to switch from one magnetization direction to the other is a limiting factor to the speed of magnetic switching as the data rate is increased. At high data-rates, the available magnetic flux from the write head, as seen by the recording layer on the magnetic medium, is limited by the low-frequency flux output of the write head.

It is also known that additional overshoot of the write current from the HDD's write driver circuitry may aid in the magnetization reversal speed. Write enhancement circuitry that provides additional overshoot beyond that provided by the write driver circuitry aids in overcoming signal transmission losses and reduces the required overshoot from the write driver.

To provide such overshoot, a single capacitor design has been proposed. FIG. 1 shows a wafer view 50 and a side view 80 of such a design, according to the prior art, Passive transmission line compensation is provided with a capacitor 52 that has been added between two layers of electrically-conductive material 54, 56 that serve as the capacitor plates. However, this design using a single capacitor 52 may cause a large impedance misbalance between the coil leads 58, 60 and the substrate 64, shown as a single parasitic capacitance 62. This parasitic capacitance 62 is undesirable but also unavoidable due to the thinness of wafer materials in the write head. When the capacitance is imbalanced at the write head, common-mode disturbances (spikes) and crosstalk problems may result. Common-mode voltage/current may occur during write signal transitions, while write-to-read crosstalk is caused by common-mode signals. The signal disturbances are harmful to the sensitive read element, and may damage the read element if not neutralized.

SUMMARY

In one embodiment, a magnetic head includes a write pole; a write coil adapted for causing the write pole to emit a magnetic field upon excitation of the write coil; and a first capacitor and a second capacitor electrically connected in parallel with the write coil, each capacitor including a planar bottom plate, a top plate positioned parallel to the bottom plate, and at least one dielectric layer positioned between the top plate and the bottom plate, wherein a parasitic capacitance between the bottom plate of each capacitor and a substrate positioned below the bottom plate exists during writing operations of the magnetic head, and wherein the parasitic capacitances of the capacitors are about balanced.

In another embodiment, a method for forming a magnetic head includes forming a first electrically permeable material above the substrate in two distinct portions to form a first and second bottom plate, the bottom plates having substantially equal surface areas facing the substrate; forming a dielectric layer above the bottom plates; forming two gaps in the dielectric layer, one gap above the first bottom plate and one gap above the second bottom plate to expose the first electrically permeable material therebeneath; forming a second electrically permeable material above the dielectric layer in two distinct portions to form a first top plate positioned above the first bottom plate and a second top plate positioned above the second bottom plate, thereby forming a first and second capacitor, wherein the top plates are positioned parallel to the bottom plates and the top plates have substantially equal surface area facing a corresponding bottom plate; forming a first coil pad electrically connected to the first top plate; and forming a second coil pad electrically connected to the second top plate, wherein a capacitance of the first capacitor is about equal to a capacitance of the second capacitor.

In yet another embodiment, a magnetic head includes a first capacitor positioned above a substrate; and a second capacitor positioned above the substrate, wherein the first and second capacitor are connected in parallel with a write coil, each capacitor including: a planar bottom plate, a top plate parallel to the bottom plate, and a dielectric layer positioned between the top plate and the bottom plate, wherein a parasitic capacitance between the bottom plate of each capacitor and the substrate exists during writing operations of the magnetic head, wherein the parasitic capacitances of the capacitors are balanced, and wherein the capacitors have a substantially equal capacitance.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
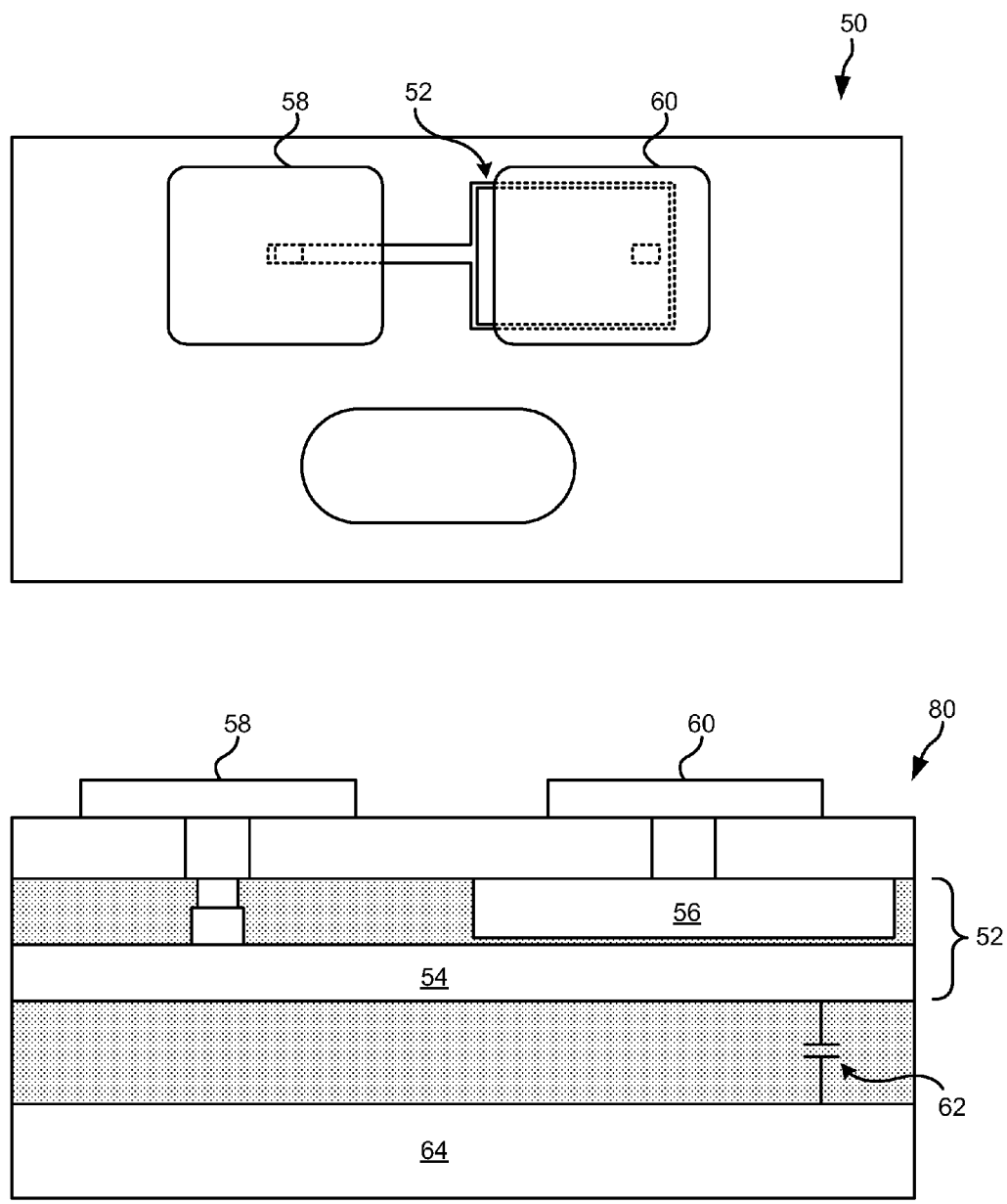
FIG. 1 includes a wafer view and a side view of a single capacitor design for a perpendicular magnetic head, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of write heads utilizing a dual parallel capacitor design for integrated transmission line compensation, as well as methods of manufacture thereof.

In one general embodiment, a magnetic head includes a write pole; a write coil adapted for causing the write pole to emit a magnetic field upon excitation of the write coil; and a first capacitor and a second capacitor electrically connected in parallel with the write coil, each capacitor including a planar bottom plate, a top plate positioned parallel to the bottom plate, and at least one dielectric layer positioned between the top plate and the bottom plate, wherein a parasitic capacitance between the bottom plate of each capacitor and a substrate positioned below the bottom plate exists during writing operations of the magnetic head, and wherein the parasitic capacitances of the capacitors are about balanced.

In another general embodiment, a method for forming a magnetic head includes forming a first electrically permeable material above the substrate in two distinct portions to form a first and second bottom plate, the bottom plates having substantially equal surface areas facing the substrate; forming a dielectric layer above the bottom plates; forming two gaps in the dielectric layer, one gap above the first bottom plate and one gap above the second bottom plate to expose the first electrically permeable material therebeneath; forming a second electrically permeable material above the dielectric layer in two distinct portions to form a first top plate positioned above the first bottom plate and a second top plate positioned above the second bottom plate, thereby forming a first and second capacitor, wherein the top plates are positioned parallel to the bottom plates and the top plates have substantially equal surface area facing a corresponding bottom plate; forming a first coil pad electrically connected to the first top plate; and forming a second coil pad electrically connected to the second top plate, wherein a capacitance of the first capacitor is about equal to a capacitance of the second capacitor.

In yet another general embodiment, a magnetic head includes a first capacitor positioned above a substrate; and a second capacitor positioned above the substrate, wherein the first and second capacitor are connected in parallel with a write coil, each capacitor including: a planar bottom plate, a top plate parallel to the bottom plate, and a dielectric layer positioned between the top plate and the bottom plate, wherein a parasitic capacitance between the bottom plate of each capacitor and the substrate exists during writing operations of the magnetic head, wherein the parasitic capacitances of the capacitors are balanced, and wherein the capacitors have a substantially equal capacitance.

In a typical magnetic head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coil current extending out from the page, while coils 312 indicate coil current extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
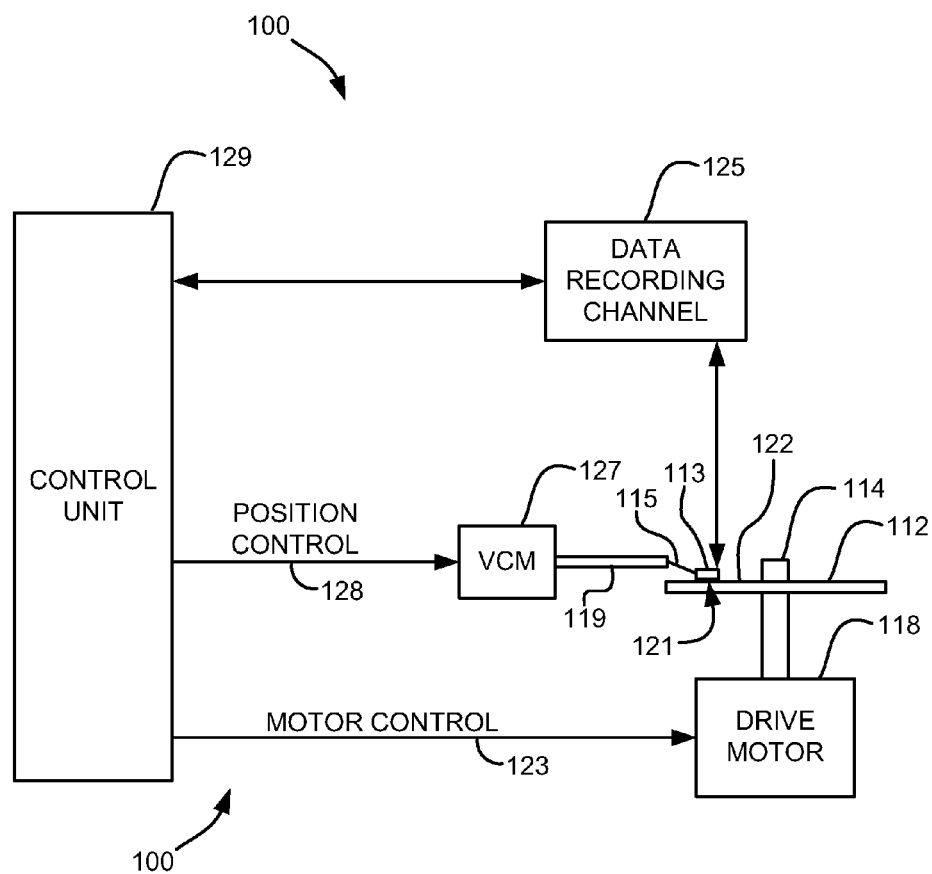
FIG. 5 is a simplified drawing of a magnetic recording disk drive system.

Referring now to FIG. 5, there is shown a disk drive 100 in accordance with one embodiment of the present invention. As shown in FIG. 5, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 5 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 5 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Figure 6:
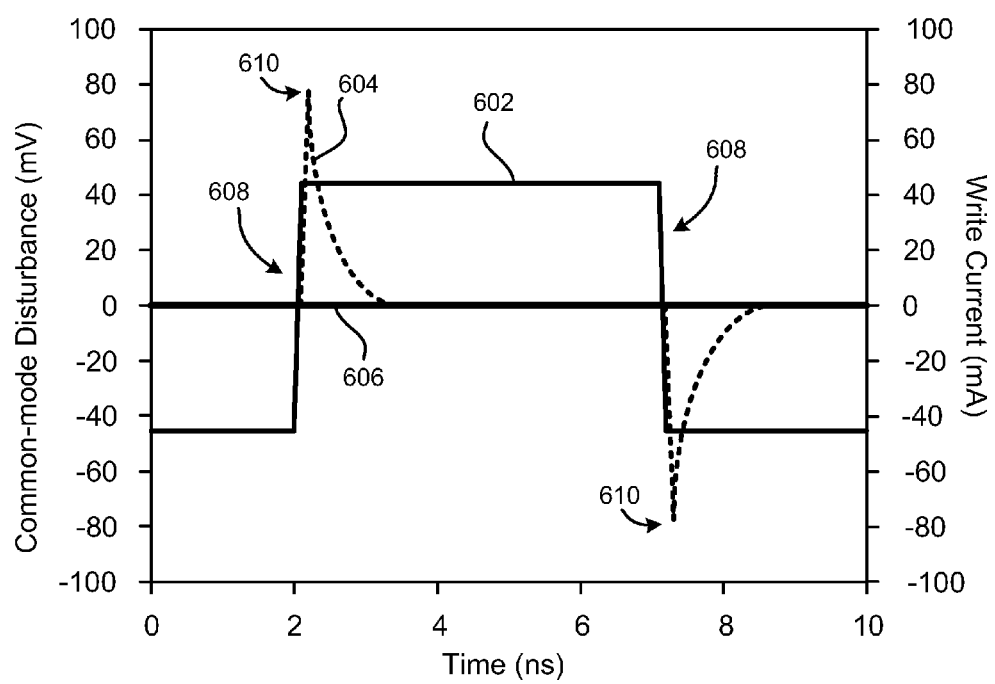
FIG. 6 shows a graph of common mode disturbance versus time for balanced and imbalanced head designs.

Now referring to FIG. 6, a problem with a write head which utilizes a single capacitance design with imbalanced impedance to the substrate is shown, according to some studies using typical values for write current and capacitor size. Common-mode voltage/current occurs during write signal transitions 608, occurring at the up and down transitions of the write signal 602. By following the response 604 of the capacitance-imbalanced design (a single capacitor design), it can be seen that large common-mode voltage spikes 610 of about 80 mV occur during each write signal transition 608. As FIG. 6 indicates, the capacitance-imbalanced design at the write head creates common-mode disturbances (spikes). Write-to-read crosstalk is caused by common-mode signals, and therefore the capacitance-imbalanced design also causes crosstalk problems. Furthermore, signal disturbances are harmful to the sensitive read element.

However, a capacitance-balanced design eliminates write head common-mode signals. By following the response 606 of the capacitance-balanced design, as described herein according to various embodiments, it can be seen that no common-mode voltage spikes occur, as the response 606 does not vary during the write signal 602 transitions 608.

Accordingly, unbalanced termination is deemed to be undesirable at the high frequencies of the write signal. Therefore, a design which eliminates this unbalanced termination would be beneficial.

Figure 7:
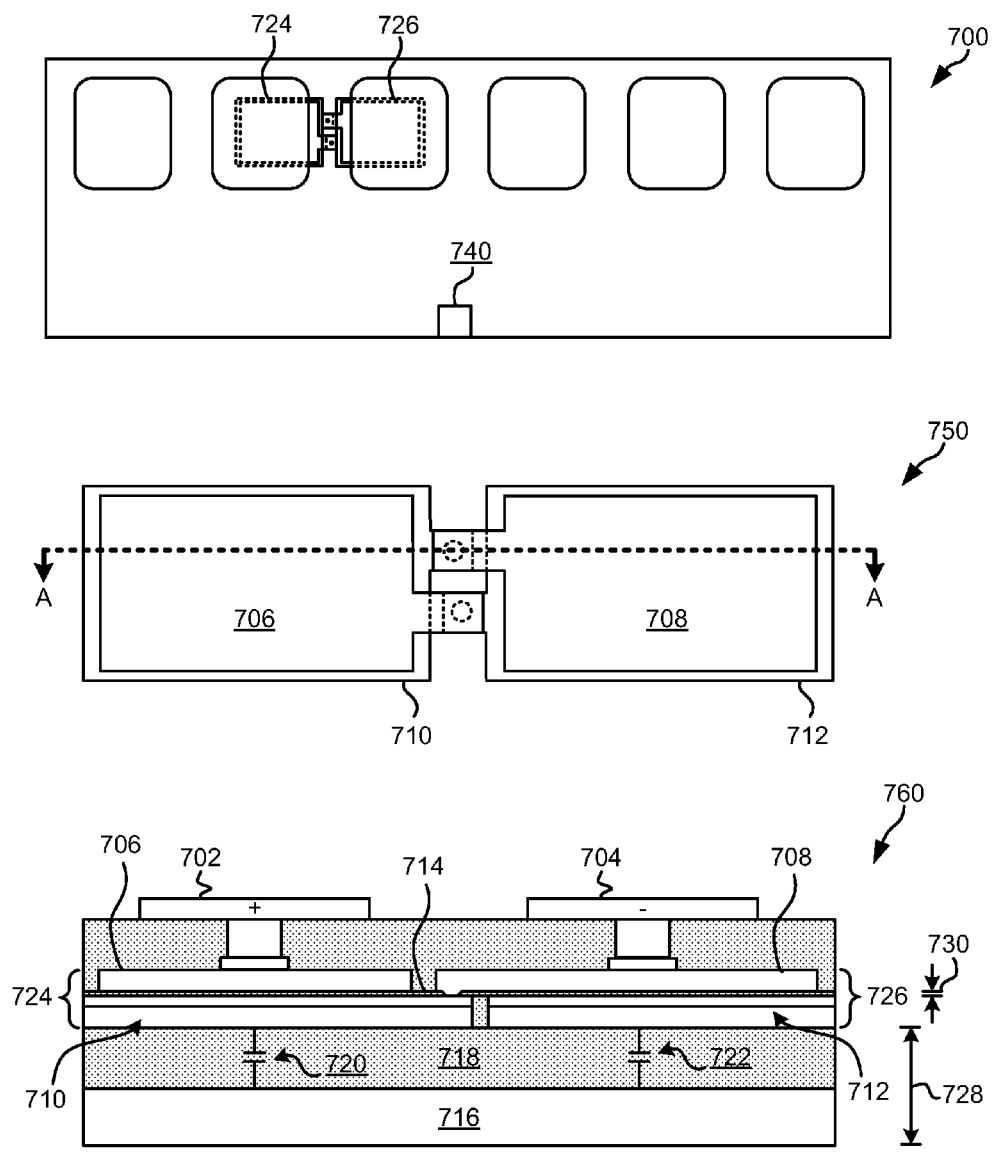
FIG. 7 shows a wafer view, a detailed overhead view, and a side view of a dual parallel capacitor design, according to one embodiment.

Now referring to FIG. 7, a wafer view 700, a detailed overhead view 750, and a side view 760 of a dual parallel capacitor design is shown according to one embodiment. The wafer view 700 is from a perspective above what would be a slider portion cut from the wafer. The detailed overhead view 750 shows a blow-up of the wafer view isolated on a portion where the dual parallel capacitors are located. The side view 760 is from a perspective of line A-A transecting the detailed overhead view 750.

The dual parallel capacitor design includes two coil pads, a positive coil pad 702 and a negative coil pad 704, which are positioned above the capacitors 724, 726. The coil pads are adapted for connecting to a write coil, which wraps around a write pole, and is adapted for causing the write pole, upon excitation of the write coils, to emit a magnetic field, as would be known by one of skill in the art. The read/write head 740 is located on a lower portion of the slider.

The first capacitor 724 comprises a top plate 706 connected via a dielectric layer 714 to a bottom plate 710. The top plate 706 is parallel to or about parallel to the bottom plate 710. The second capacitor 726 comprises a top plate 708 connected via the dielectric layer 714 to a bottom plate 712. The top plate 708 is positioned parallel to or about parallel to the bottom plate 712. Each capacitor 724, 726 also inevitably has an unwanted parasitic capacitance 720, 722, respectively, to the substrate 716 which bridges the dielectric layer 718. The capacitors 724, 726 are electrically connected in parallel with the coil pads 702, 704 via the top plates 706, 708 of each capacitor. The parasitic capacitances 720, 722 exist at all times, but are influential only during writing operations of the magnetic head when a write coil is activated and a magnetic field is produced by a write head.

According to this dual parallel capacitor design, the AC coupling 720, 722 between the bottom plates 710, 712 of the capacitors 724, 726 and the substrate 716 is balanced. This improves the reliability of the heads which employ this design.

The shunt capacitance (SC) of the dual parallel capacitor design may be calculated accordingly: $SC=2C+Cs/2$, where the capacitance (C) of each of the first capacitor 724 and second capacitor 726, individually, is much greater than the parasitic capacitance (Cs) 720, 722 between each capacitor 724, 726 and the substrate 716, $Cs<<C$. As can be seen, since the parasitic capacitance for each capacitor is much less than the capacitance of each capacitor, the capacitance of each capacitor is equal to about half of the desired shunt capacitance.

According to one embodiment, the cumulative capacitance (shunt capacitance) of the capacitor network described above may be in a range from about 1.0 pF to about 5.0 pF, such as about 2.9 or 3.0 pF. In order to achieve about 3.0 pF of shunt capacitance, each capacitor 724, 726 may have a capacitance of about 1.5 pF which when used in parallel, result in a cumulative capacitance of about 3.0 pF. This results in each parasitic capacitance 720, 722 being about 86 fF.

In order to achieve these capacitances, in one embodiment, a distance 728 between the substrate 716 and the bottom plates 710, 712 of each of the capacitors 724, 726 may be from about 2.0 µm to about 3.0 µm, such as about 2.6 µm. Furthermore, a height 730 of the dielectric layer 714 may be from about 0.1 µm to about 0.2 µm, such as about 0.15 µm, in one embodiment. In these embodiments, an area of the surface of the bottom plates 710, 712 of each capacitor 724, 726 may be from about 2000 µm$^2$ to about 4000 µm$^2$, such as about 2800 µm$^2$. A preferred dielectric for magnetic recording wafers is alumina, which typically has a relative dielectric constant of about 9. Use of other dielectric materials is acceptable, but the plate area must be adjusted to accommodate the dielectric constant of whatever dielectric material is used.

In any embodiment, the distance 728, the height 730, the surface areas of the bottom plates 710, 712 of each capacitor 724, 726, and/or the materials for all layers may be controlled in order to provide a desired shunting of the capacitor network.

In some approaches, the dual parallel capacitor design for the magnetic head 740 as shown in FIG. 7 may be used in any magnetic data storage system. One exemplary magnetic data storage system is shown in FIG. 5. For example, the magnetic data storage system 100 may comprise at least one magnetic head 121 as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

Figure 8:
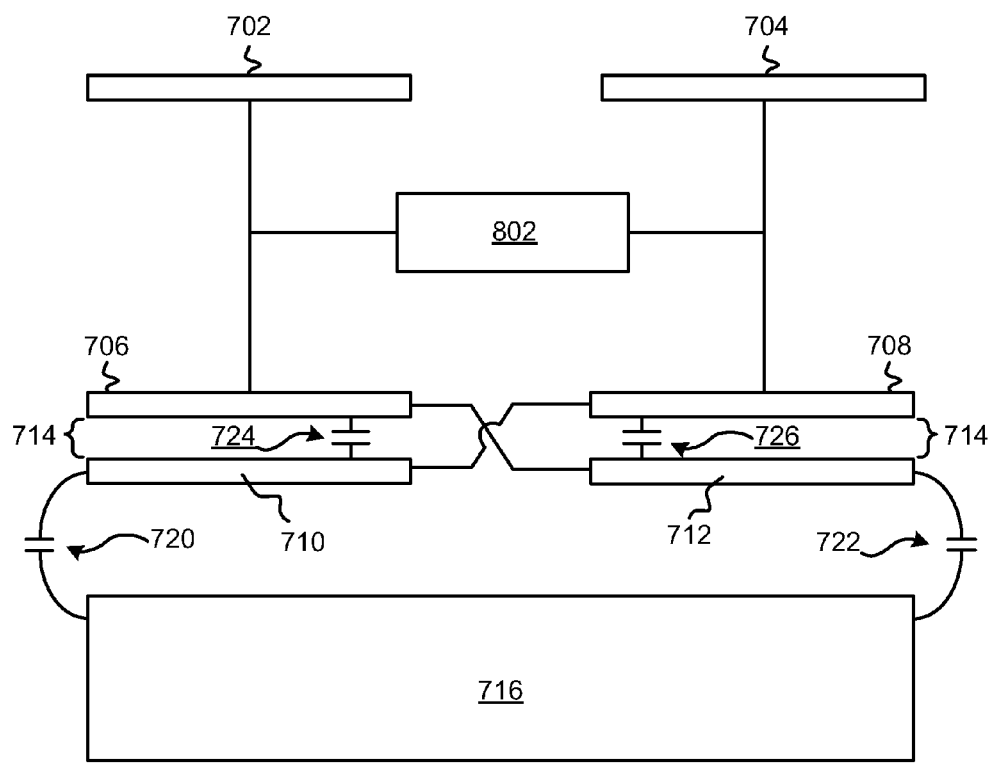
FIG. 8 is a schematic diagram showing electrical connections for a dual parallel capacitor design, according to one embodiment.

Now referring to FIG. 8, a schematic diagram showing electrical connections for a dual parallel capacitor design is shown according to one embodiment. Here, it can be seen that the left coil pad (positive pad) 702 is connected across the coil 802 with the right coil pad (negative pad) 704. Furthermore, the first capacitor 724 and the second capacitor 726 are connected in parallel with the coil 802. Each capacitor has a parasitic capacitance 720, 722 to the substrate 716. The first capacitor 724 comprises a top plate 706 connected via a dielectric layer 714 to a bottom plate 710 to cause capacitance therebetween. Similarly, the second capacitor 726 comprises a top plate 708 connected via the dielectric layer 714 to a bottom plate 712 to cause capacitance therebetween. Moreover, the second capacitor's top plate 708 is connected to the first capacitor's bottom plate 710, while the first capacitor's top plate 706 is connected to the second capacitor's bottom plate 714.

In order to obtain the beneficial effects described herein of eliminated write current induced voltage spikes, the parasitic capacitance 720, 722 of each capacitor 724, 726 should be balanced. This is possible by ensuring that the bottom plate of each capacitor has the same surface area exposed to the substrate 716 and is positioned the same distance away from the substrate 716. Therefore, in one embodiment, bottom plate 710 has the same or substantially the same bottom surface area as bottom plate 712, and bottom plate 710 is positioned the same or substantially the same distance from the substrate 716 as bottom plate 712 through a material 714 with the same or substantially the same dielectric constant. What is meant by "substantially" is within the finest tolerances allowable in a lithography or processing method in which the capacitors 724, 726 are formed.

This results in two identical or almost identical capacitors 724, 726 positioned identically or substantially identically with respect to the substrate 716 and connected in parallel with respect to the coil 802. As a result, the parasitic capacitance 720, 722 of each capacitor 724, 726 is balanced.

In FIGS. 9A-9I, a top view and a cross-sectional view taken from line A-A of the top view are shown during steps of a magnetic head formation process, according to one embodiment As an option, the present method may be implemented to construct structures such as those shown in FIGS. 1-7. Of course, however, this method and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

Figure 9A:
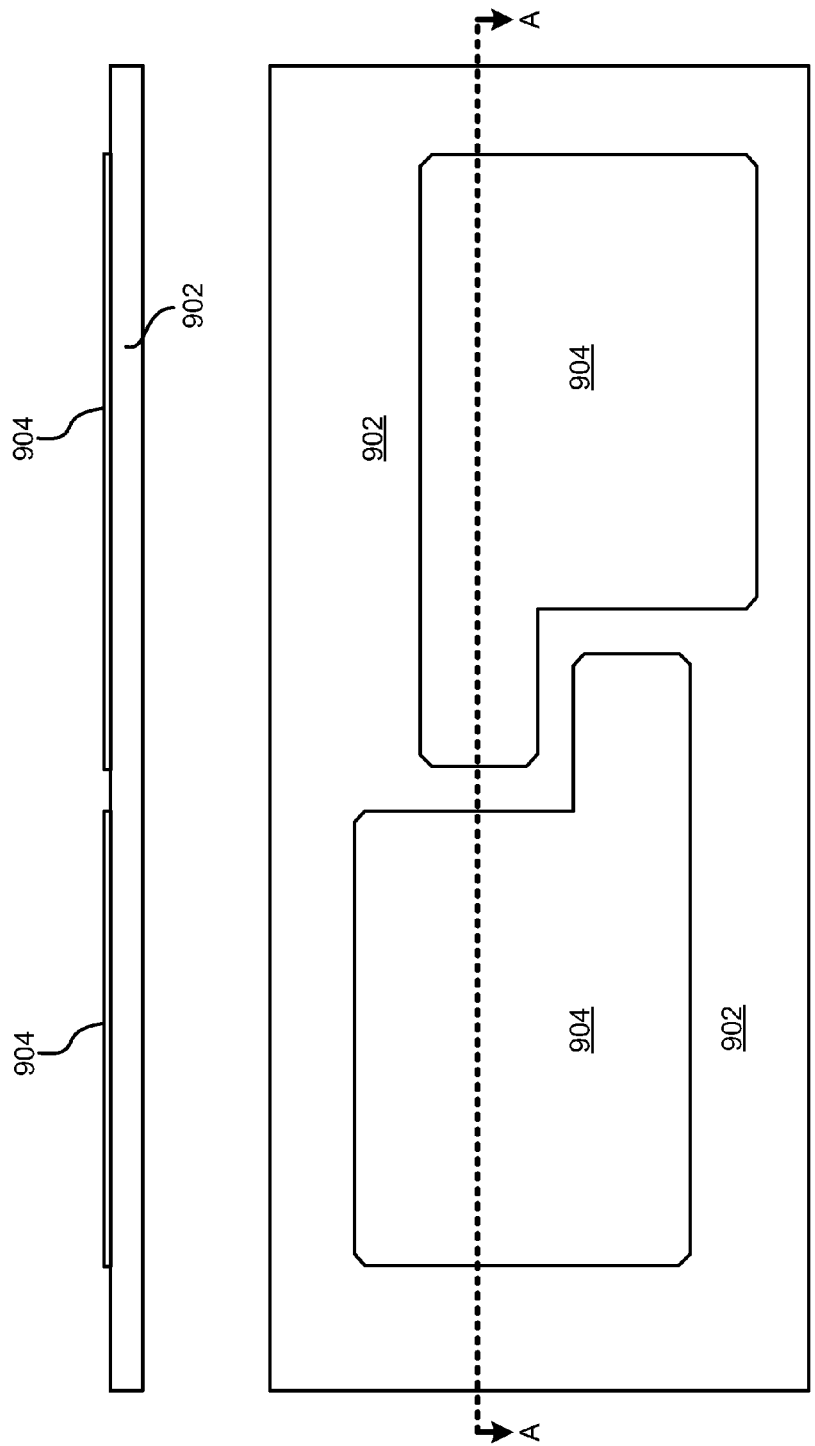
FIGS. 9A-9I show a cross-sectional view and a top view of a magnetic head formation process according to one embodiment.

In FIG. 9A, space is reserved below the writer pads to build two capacitors in target areas (synonymous with seed layer 904 areas), the bottom side of the bottom plate being parallel with the top of the first shield (Shield 1) of the reader. This location and elevation from the substrate makes use of an area that is normally unused in a recording head and places the capacitors several microns from the substrate 902 which allows for reducing unwanted parasitic capacitance. A seed layer 904 is deposited full film above the substrate 902, in one approach. The seed layer 904 may be deposited to cover the target areas and may comprise any suitable material known in the art capable of being a seed layer for a conductive metal to be plated thereon. This seed layer 904 may also be used in other portions of the wafer to form other seed layers for plating thereon which may form other structures of a magnetic head, such as a second shield (Shield 2) of the reader, as would be understood by one of skill in the art upon reading the present descriptions.

Figure 9B:
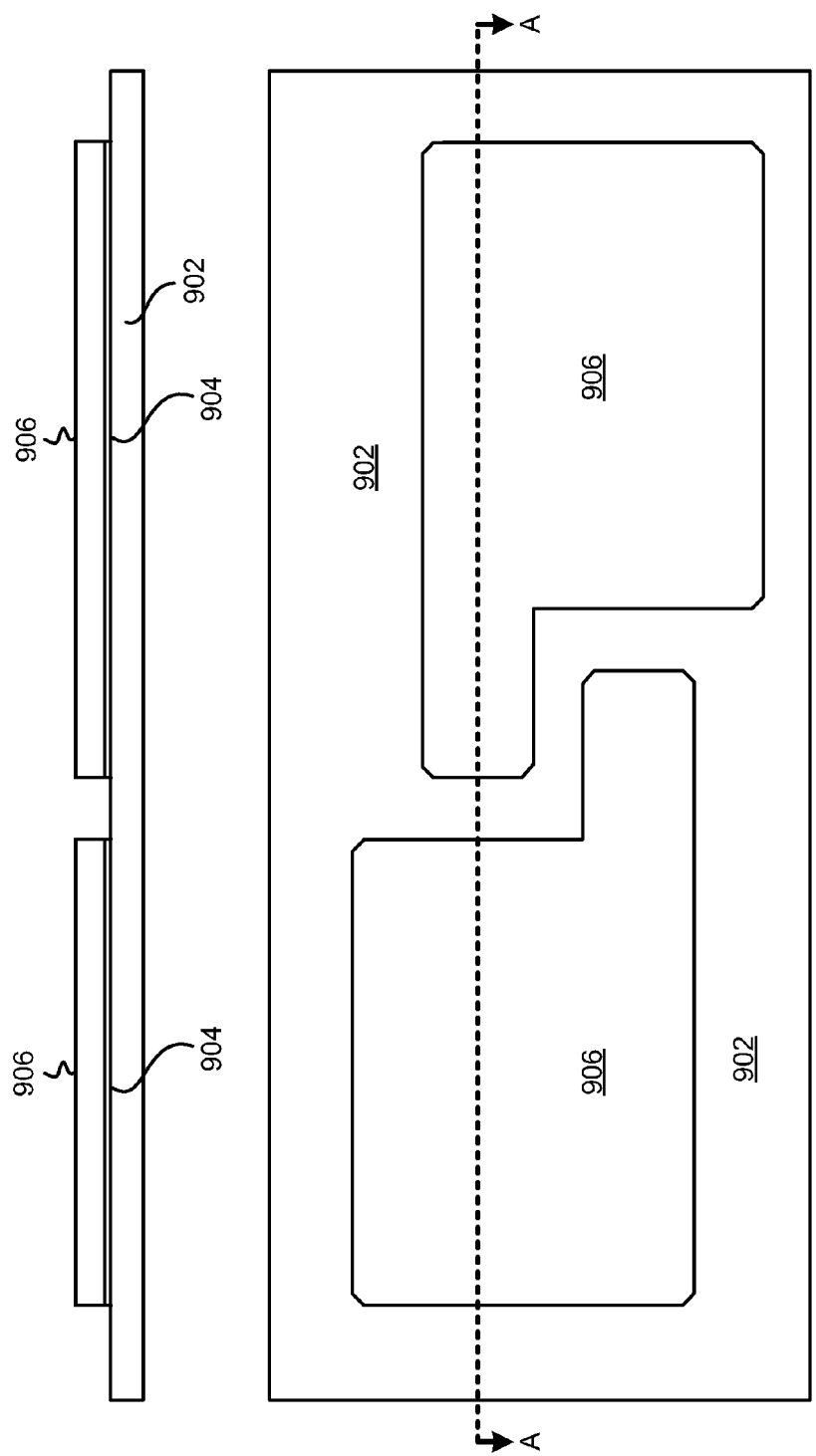

In FIG. 9B, a first electrically permeable material 906 is plated on the seed layer 904. The first electrically permeable material 906 may comprise any suitable material known in the art capable of being used as a bottom plate of a capacitor, such as NiFe, CoFe, CoPtFe, and other electrically permeable materials known in the art. The surface area between the first electrically permeable material 906 and the first dielectric layer 902 (the surface area of the first electrically permeable material 906 facing the first dielectric layer 902 and any layers therebeneath, such as a substrate) is equal for each portion of the first electrically permeable material 906, in one approach.

In one embodiment, the first electrically permeable material 906 may comprise a material used to form an upper shield for a reader (such as $Ni_{80}Fe_{20}$). In this embodiment, the upper shield for the reader may be formed in the same lithography step (e.g., a common photolithography step) as the first electrically permeable material 906.

Figure 9C:
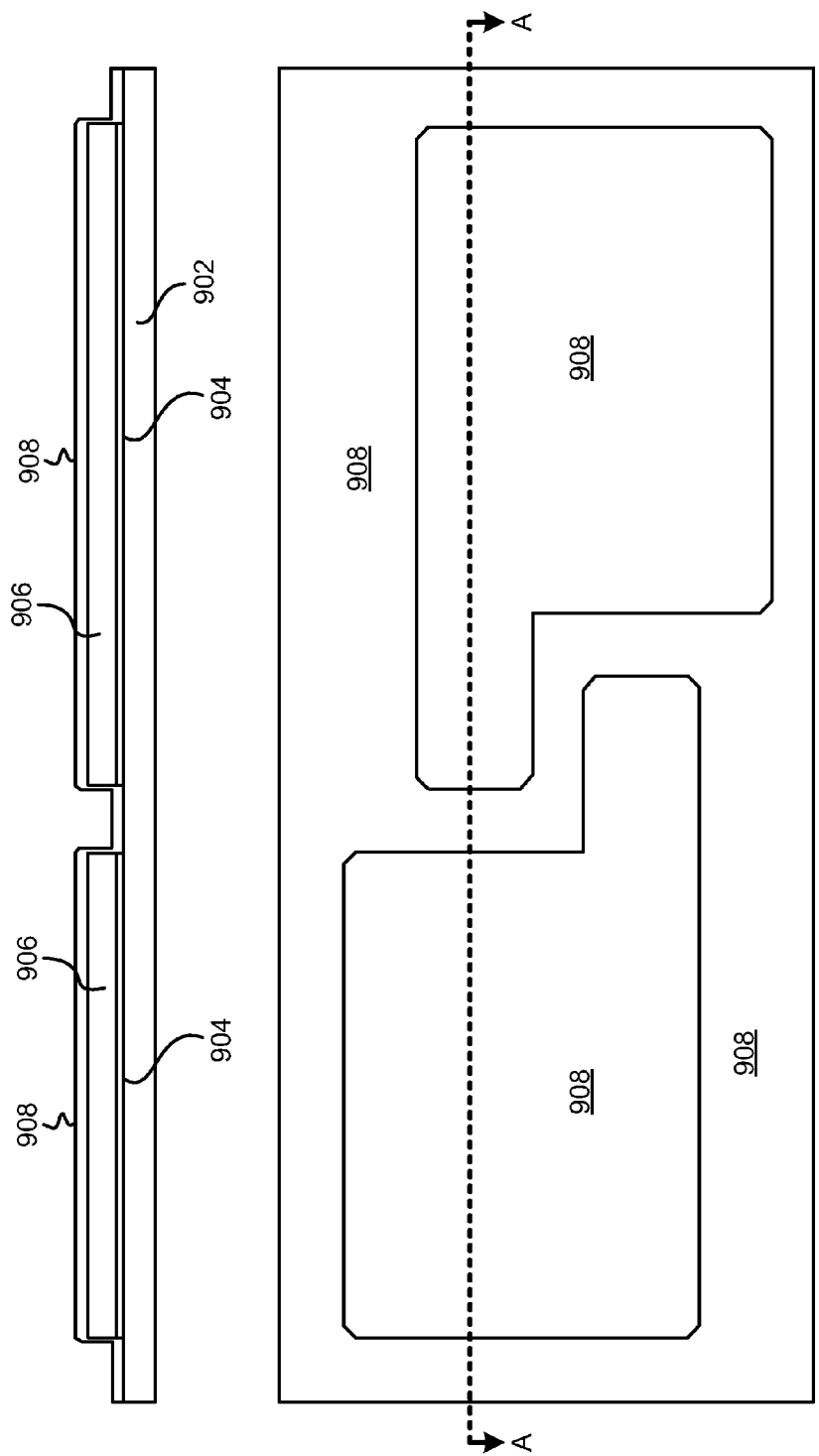

In FIG. 9C, a separation gap 908 is formed above the first electrically permeable material 906 which will function as a gap between the bottom pole of the writer and the upper shield of the reader. Accordingly, this separation gap 908 is not necessary for the construction of the capacitors, and this step may be omitted from the construction of the capacitors.

A height of this gap 908 is controlled, and may be from about 100 nm to about 400 nm, such as about 250 nm in one approach. In one embodiment, the separation gap 908 may be formed full film. Any suitable material may be used for the separation gap 908, such as a dielectric material like alumina ($Al_2O_3$), magnesium oxide (MgO), silicon dioxide ($SiO_2$), etc.

Figure 9D:
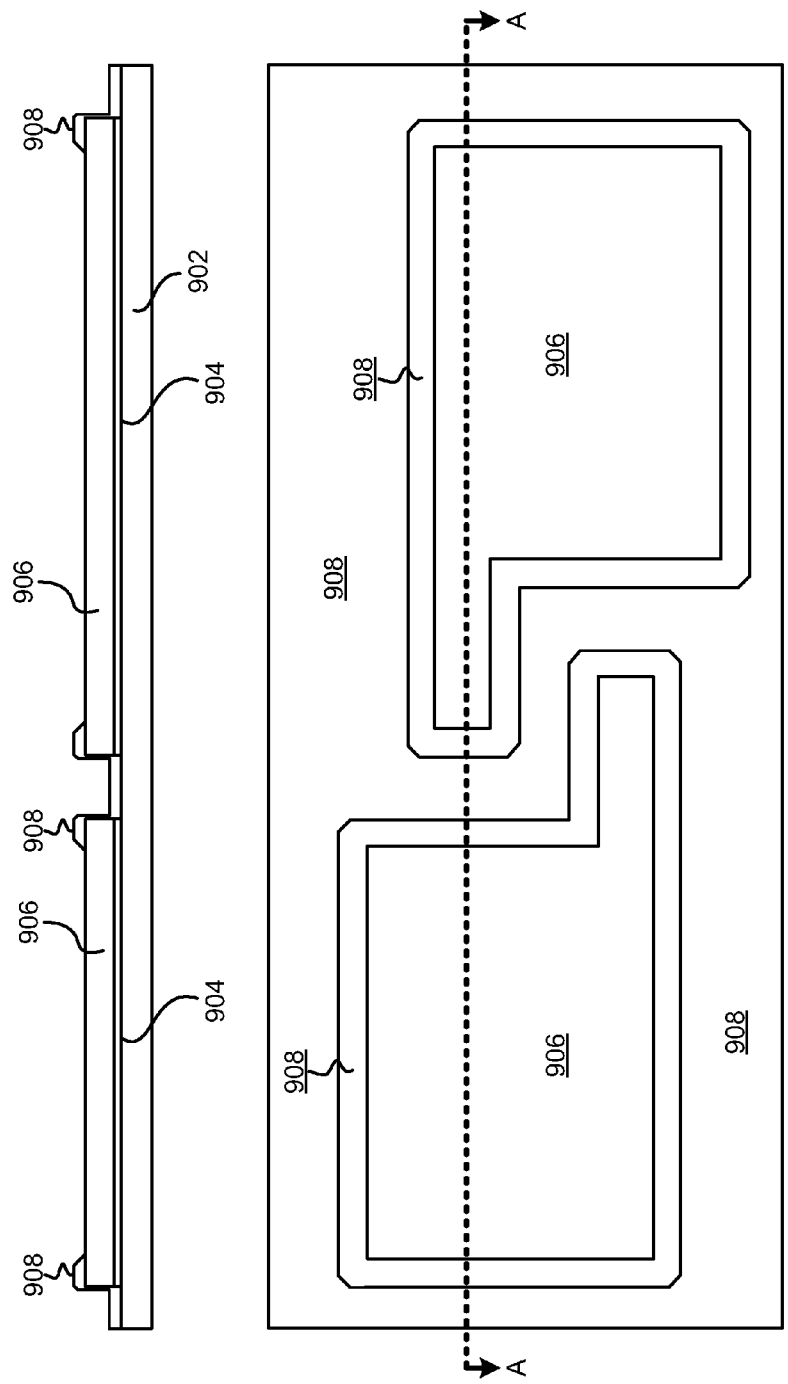

In FIG. 9D, an etch, such as a wet etch, a liftoff, or some other suitable technique is used to remove the separation gap 908 material from the top of the first electrically permeable material 906. As shown, a portion of the separation gap 908 material may remain on edges of the first electrically permeable material 906, without negatively affecting the performance of the device.

Figure 9E:
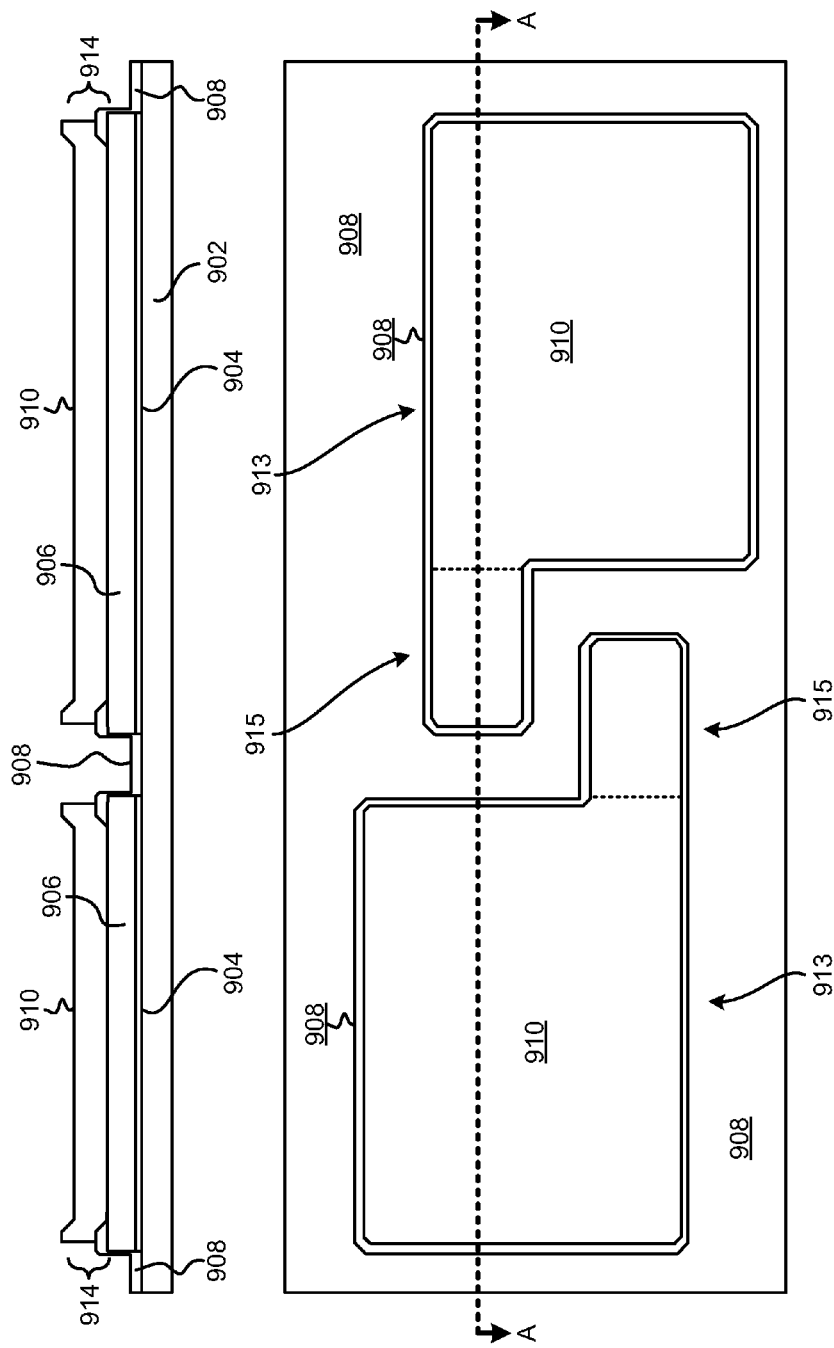

In FIG. 9E, a second electrically permeable material 910 is formed above the first electrically permeable material 906 thereby forming a bottom plate for each capacitor. The second electrically permeable material 910 may overlap portions of the separation gap 908 that remains above edges of the first electrically permeable material 906 after the removal process, in some approaches. Any suitable material known in the art may be used for the second electrically permeable material 910, such as NiFe, CoFe, CoPtFe, etc.

In one embodiment, the second electrically permeable material 910 may comprise the same material used for a first pole of the writer, such as $Ni_{80}Fe_{20}$, $Ni_{45}Fe_{55}$, etc. In this embodiment, the first pole of the writer may be formed in the same lithography step as the second electrically permeable material 910.

Figure 9F:
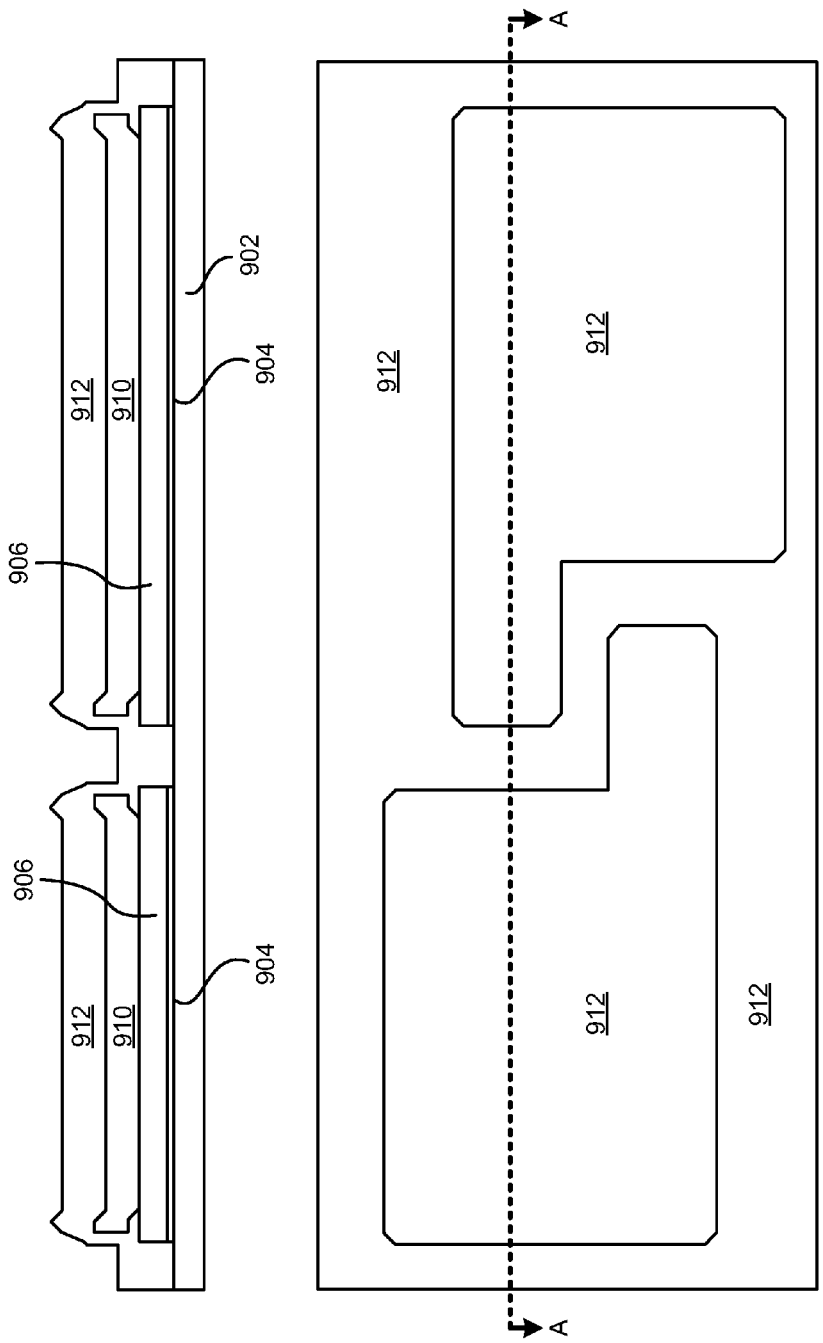

In FIG. 9F, a dielectric material is formed above the second electrically permeable material 910 to form a second dielectric layer 912, in a manner which allows the dielectric material to be used in a planarization step. In several approaches, the dielectric material may comprise alumina, magnesium oxide, silicon dioxide, or some other suitable dielectric material.

According to one embodiment, a chemical mechanical polishing (CMP) stop layer may be formed above portions of the second dielectric layer 912 to indicate a stopping point for a CMP process to planarized the layers.

Figure 9G:
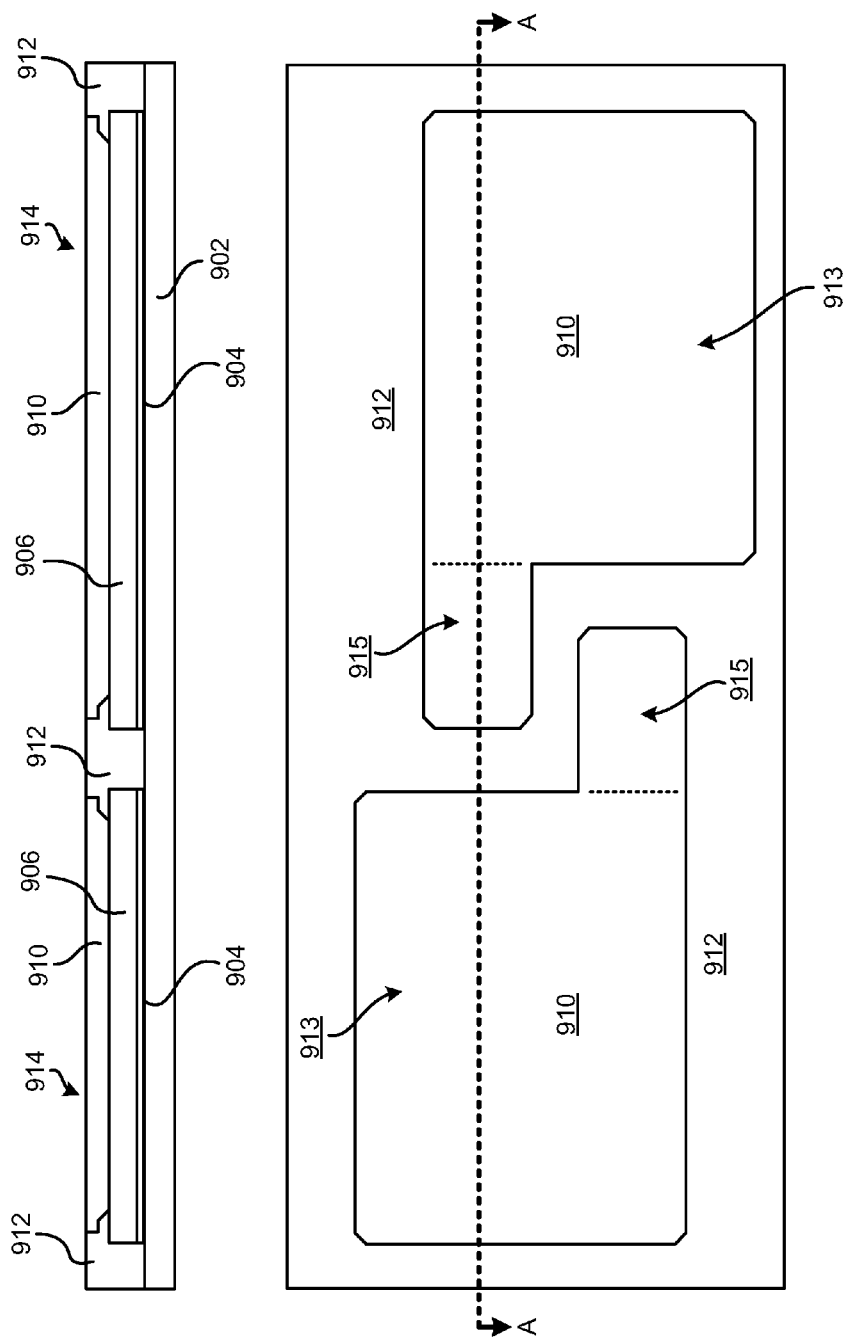

In FIG. 9G, planarization is performed using any suitable method known in the art to remove upper portions of the second electrically permeable material 910 and the second dielectric layer 912 to form capacitor bottom plates 914. In one embodiment, CMP may be used to planarized the structure.

In one approach, each bottom plate 914 for each capacitor may comprise a bottom plate portion 913 and a bottom tab 915 extending from the bottom plate portion 913, which also extend toward the bottom plate of the other capacitor, as shown.

In addition, in some approaches, insulation for a write coil may be formed in the same lithography step as the formation of the second dielectric layer 912.

Figure 9H:
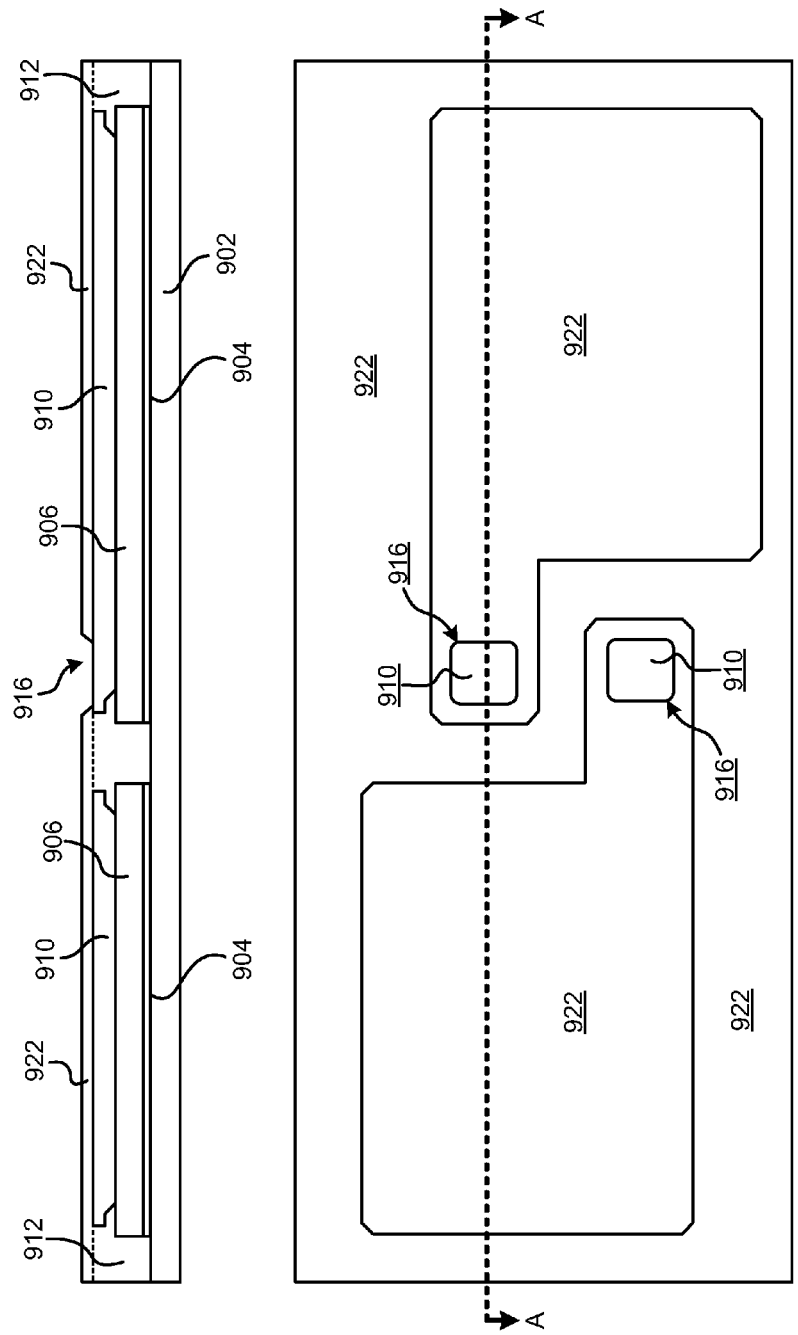

In FIG. 9H, a third dielectric layer 922 is formed above the capacitor bottom plates 914, and a gap liftoff process is performed to provide gaps 916 through the second dielectric layer 922 to expose portions of the second electrically permeable material 910 which comprises the bottom plates 914 in order to subsequently form connections thereto. Any suitable process known in the art may be used to form the gaps 916, and the gap formation is not limited to using a liftoff process.

In one embodiment, each of the gaps 916 are the same size. The location of the gaps 916 on the protruding portions of the bottom plates 914 is beneficial for interconnecting the bottom plates 914 with subsequently formed top plates.

In another embodiment, the height of the third dielectric layer 922 is used to at least partially determine a capacitance of the capacitors formed from this structure. Accordingly, the thickness of the third dielectric layer 922 may be controlled in some approaches, either through the formation process, or more preferred, through the removal process.

In one embodiment, the thickness of the third dielectric layer 922 may be from about 100 nm to about 300 nm, such as about 150 nm.

In another embodiment, the second dielectric layer 912 and the third dielectric layer 922 may comprise the same material or a different material, such as alumina, MgO, $SiO_2$, etc.

In a specific embodiment, another layer of dielectric material may be formed above portions of the third dielectric layer 922 to provide additional thickness for other portions of the wafer. This additional layer of dielectric material may have a thickness of about 200 nm, in some approaches.

Figure 9I:
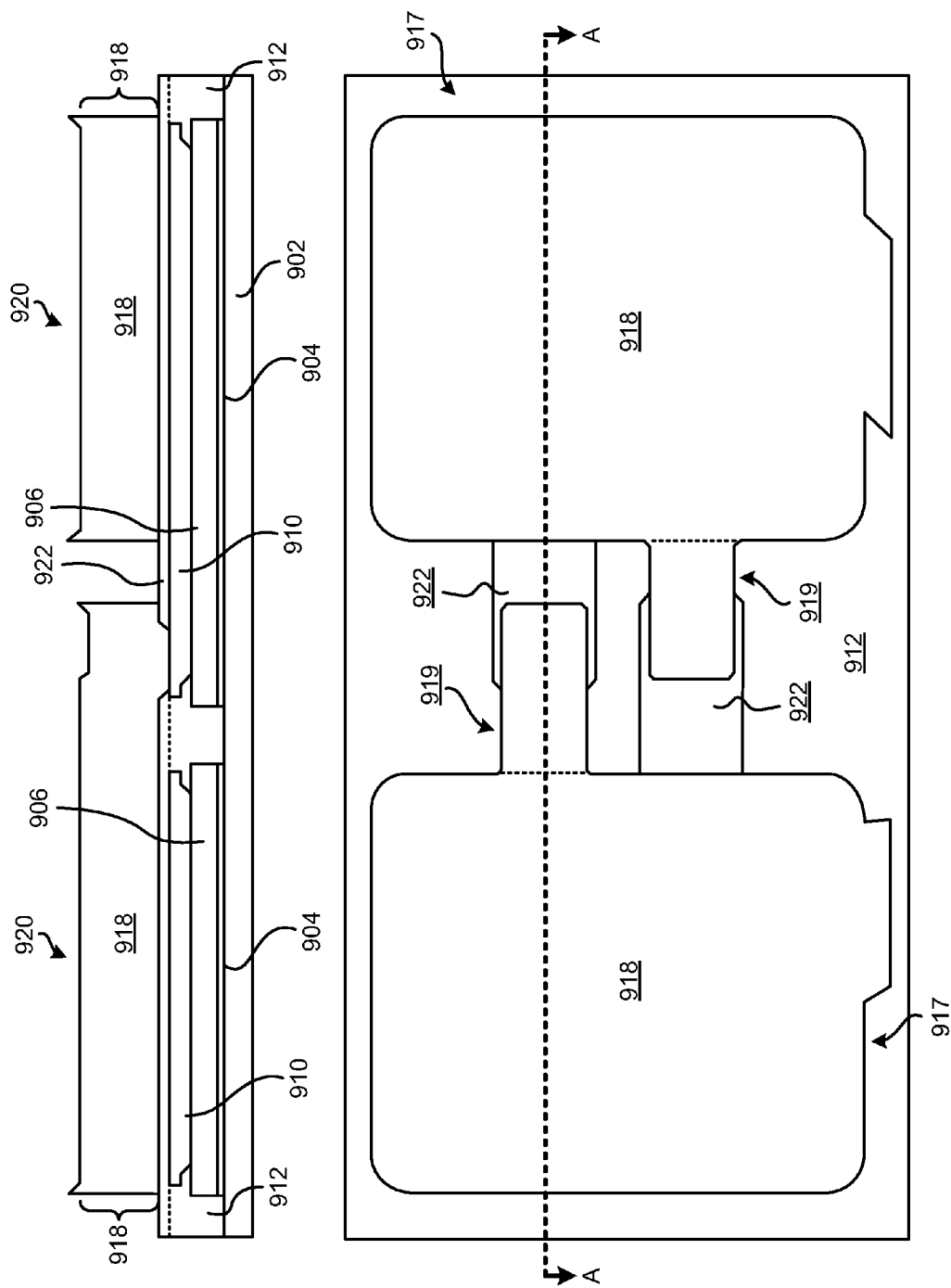

In FIG. 9I, top plates 918 of the capacitors 920 are formed above the dielectric material 922 and the gaps 916. Moreover, top plates 918 for each capacitor 920 connect through the gaps 916 to the bottom plates 914 of the opposite capacitor 920. Any suitable material known in the art may be used for the top plates 918, such as Cu.

The top plates 918 of each capacitor 920 each comprise a top plate portion 917 and a top tab 919 extending from the top plate portion 917, which also extend toward the top plate of the other capacitor, as shown.

In one embodiment, the bottom plates 914 of each capacitor 920 are oriented substantially parallel with the top plates 918 of each capacitor 920. It is desirable to have them exactly parallel, so they are oriented parallel as far as manufacturing techniques allow.

In this way, the bottom tab 915 of the bottom plate 914 of a first capacitor is electrically connected with the top tab 919 of the top plate 918 of a second capacitor while the bottom tab 915 of the bottom plate 914 of the second capacitor is electrically connected with the top tab 919 of the top plate 918 of the first capacitor via the gaps 916.

Each of the top plates 918 may have a polygonal shape or any other shape suitable for manufacture in a magnetic head manufacturing process.

In one approach, a material used to form the write coil may be used to form the top plates 918, such as Cu or some other suitable electrically permeable material. In this embodiment, the write coil of the writer may be formed in the same lithography step as the top plates 918, e.g., the top plates 918 may be formed during partial formation of the write coils (Coil 1 fabrication step).

Other processing operations may be performed before, after, or in between any of the operations described in FIGS. 9A-9I, according to various embodiments, and as would be known in the art. For example, the dielectric layer 902 may be formed above a substrate, which may cause parasitic capacitance with the bottom plates 914 of the capacitors 920, in one embodiment.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a write pole;
a write coil adapted for causing the write pole to emit a magnetic field upon excitation of the write coil; and
a first capacitor and a second capacitor electrically connected in parallel with the write coil, each capacitor comprising:
a planar bottom plate;
a top plate positioned parallel to the bottom plate; and
at least one dielectric layer positioned between the top plate and the bottom plate,
wherein a parasitic capacitance between the bottom plate of each capacitor and a substrate positioned below the bottom plate exists during writing operations of the magnetic head, and
wherein the parasitic capacitances of the capacitors are about balanced.

2. The magnetic head as recited in claim 1, wherein the capacitors have a substantially equal capacitance.

3. The magnetic head as recited in claim 2, wherein the equal capacitance is about 1.0 pF to about 2.0 pF.

4. The magnetic head as recited in claim 3, wherein a cumulative parallel capacitance of the capacitors is from about 2.0 pF to about 4.0 pF.

5. The magnetic head as recited in claim 1, further comprising a second dielectric layer positioned between the bottom plates of the capacitors and the substrate.

6. The magnetic head as recited in claim 1, wherein the bottom plates and the top plates comprise electrically permeable material.

7. The magnetic head as recited in claim 1, further comprising a first coil pad electrically connected to the top plate of the first capacitor and a second coil pad electrically connected to the top plate of the second capacitor such that the coil pads are electrically connected in parallel with the capacitors.

8. The magnetic head as recited in claim 1, wherein a tab extending from the bottom plate of the first capacitor is positioned below and in electrical communication with a tab extending from the top plate of the second capacitor, and wherein a tab extending from the top plate of the first capacitor is positioned above and in electrical communication with a tab extending from the bottom plate of the second capacitor.

9. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

10. A magnetic head, comprising:
a first capacitor positioned above a substrate; and
a second capacitor positioned above the substrate, wherein the first and second capacitor are connected in parallel with a write coil, each capacitor comprising:
a planar bottom plate;

a top plate parallel to the bottom plate; and
a dielectric layer positioned between the top plate and the bottom plate,
wherein a parasitic capacitance between the bottom plate of each capacitor and the substrate exists during writing operations of the magnetic head,
wherein the parasitic capacitances of the capacitors are balanced, and
wherein the capacitors have a substantially equal capacitance.

* * * * *